PIEZOELECTRIC PHONOGRAPH PICKUP WITH INTERCHANGEABLE STYLI
Filed June 15, 1960 2 Sheets-Sheet 1
FIG. 1
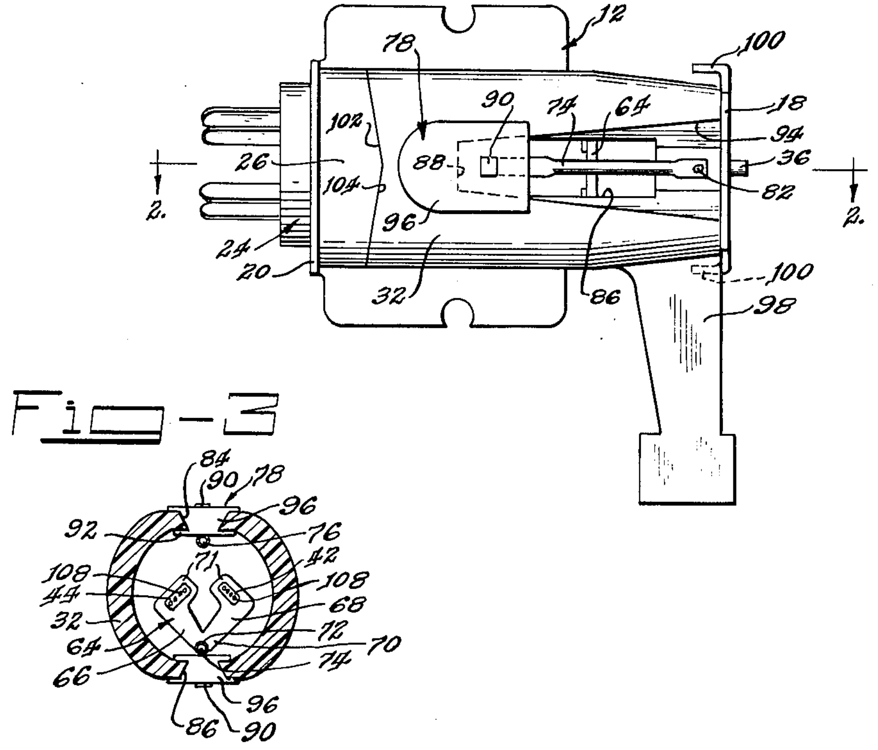
FIG. 1, FIG. 3
FIG. 2
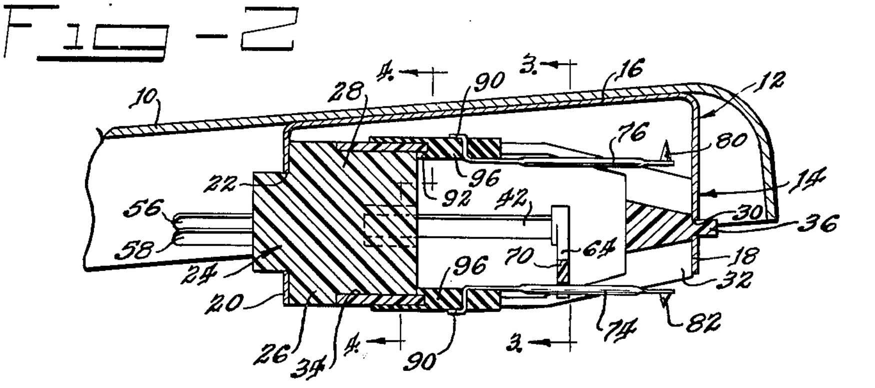
Inventors
Alpha M. Wiggins
John F. Wood
By: Stone, Nierman, Burmeister
& Zummer
Attorneys

PIEZOELECTRIC PHONOGRAPH PICKUP WITH INTERCHANGEABLE STYLI

Filed June 15, 1960 2 Sheets-Sheet 2

Inventors
Alpha M. Wiggins
John F. Wood
By: Stone, Nierman,
Burmeister & Zummer
Attorney United States Patent Office 3,235,673
Patented Feb. 15, 1966

3,235,673

PIEZOELECTRIC PHONOGRAPH PICKUP WITH INTERCHANGEABLE STYLI

Alpha M. Wiggins and John F. Wood, both of Box 800, Roosevelt, Puerto Rico

Filed June 15, 1960, Ser. No. 100,770
1 Claim. (Cl. 179—100.41)

The present invention relates to phonograph pickups and particularly to phonograph pickups for generating two electrical signals from a single groove of a stereophonic phonograph record disc.

There are at least two different groove widths in common use in commercial phonograph records, and the different width record grooves require styli of different diameters. This has been true of monophonic phonograph records for some years. With the advent of stereophonic phonograph records in which two electrical signals are generated from a single record groove, it was initially believed that the need for a plurality of styli diameters would be overcome. However, most stereophonic phonograph pickups in present day use are also designed to reproduce monophonic records, and hence the stereophonic phonograph pickups also require more than one stylus.

One solution to the problem of providing a stereophonic phonograph pickup with two styli of different diameters is disclosed in the application of John F. Wood, Serial No. 802,917, filed March 30, 1959, now Patent No. 2,974,-879, entitled "Electromechanical Transducer." The phonograph pickup disclosed in this patent application employs a pair of ceramic piezoelectric generating elements compliantly mounted at one end and carrying a yoke at the other end. Two styli are coupled mechanically to opposite sides of the yoke, and the entire assembly of generating elements and yoke is provided with a turnover mechanism so that one or the other stylus is in position to contact and engage the groove of a stereophonic record.

The construction disclosed in the above referred to patent application has the disadvantage of requiring rotation of the generating elements of the phonograph pickup, and hence the electrical leads extending from the pickup to the other portions of the phonograph must be capable of withstanding 180 degrees of rotation. Another disadvantage of this construction is that the second stylus and its associated drive arm are at all times coupled to the yoke, thereby adding mass to the moving system which may adversely affect its operation. John F. Wood also provided a mechanism for a monaural phonograph pickup with two styli which decouples one of the styli of the generating element when not in use, as disclosed in Patent No. 2,931,658, issued April 5, 1960.

It is an object of the present invention to provide an improved phonograph pickup having a plurality of styli for engaging grooves of phonograph records of different widths in which only one of the styli is coupled to the generating element at any given time.

It is a further object of the present invention to provide a stereophonic and monaural phonograph pickup having two styli for use with records of different width grooves in which only one of the styli is coupled to the generating elements of the phonograph pickup at any one time.

Further, it is an object of the present invention to provide a turnunder type phonograph pickup carrying a stylus on each of two opposite sides of the casing of the phonograph pickup, in which the generating elements of the phonograph pickup remain stationary while the styli are interchanged by rotation of the casing.

These and further objects of the present invention will become readily apparent to those skilled in the art from a further reading of the present disclosure, particularly when viewed in the light of the drawings, in which:

FIGURE 1 is a plan view of a phonograph pickup constructed according to the teachings of the present invention;

FIGURE 2 is a sectional view of the phonograph pickup illustrated in FIGURE 1 taken along the line 2—2 of FIGURE 1 and associated tone arm;

FIGURE 3 is a sectional view of the phonograph pickup taken along the line 3—3 of FIGURE 2;

Figure 4:
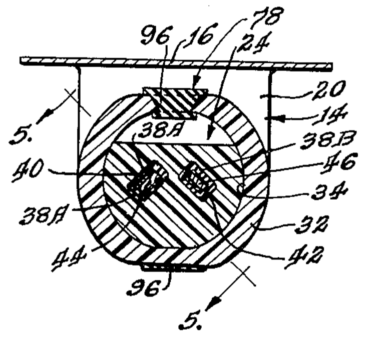
FIGURE 4 is a sectional view of the phonograph pickup taken along the line 4—4 of FIGURE 2.

FIGURE 2 fragmentarily illustrates a tone arm of a phonograph, designated 10, and a phonograph pickup 12 is mounted adjacent to the end of the tone arm 10. The phonograph pickup 12 has a bracket 14 with a flat central portion 16 abutting and mounted on the tone arm 10 and two leg portions 18 and 20 extending from the central portion 16 generally parallel to each other.

The leg portion 20 has a noncircular aperture 22 therein, and a mounting member 24 is mounted within the aperture 22. The mounting member 24 has a protruding portion 26 abutting the innerside of the leg 20 and a cylindrical portion 28 extending from the protruding portion 26 toward the leg 18 of the bracket 14. The leg 18 is provided with a small circular opening 30 which is disposed approximately on the axis of the cylindrical portion 28 of the mounting member 24. A housing or casing 32 having a circular cavity or recess extending therein from opening or mouth 34 at one end and an outwardly extending cylindrical stem 36 at the other end is mounted with its circular opening 34 about the cylindrical portion 28 of the mounting member 24, and the stem 36 is journaled within the circular opening 30 in the leg 18 of the mounting bracket 14.

The mounting member 24 is constructed of relatively rigid electrically insulating material, such as polyethylene plastic. The cylindrical portion 28 of the mounting member 24 has a pair of generally rectangular recesses 38A and 38B extending therein from a surface remote from the leg 20 of the mounting bracket 14. The two recesses 38A and 38B have generally parallel longitudinal axes, and their longer transverse axes are normal to each other as indicated in FIGURE 4. Two compliant sleeves 40 and 42 are disposed in the two rectangular portions 38A and 38B, and each of the compliant sleeves is disposed about one end of ceramic piezoelectric generating elements 44 and 46. Each of the generating elements 44 and 46 has a pair of eletcrodes 48 and 50 disposed on the opposite surfaces thereof, the electrodes 48 and 50 being parallel with the longer dimension of the rectangular recesses 38A and 38B, respectively.

Figure 6:
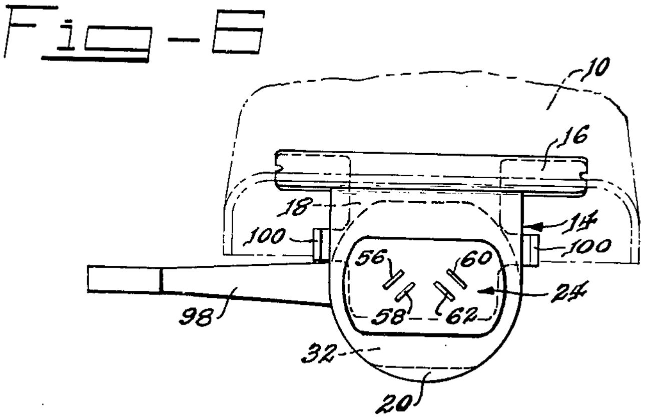
FIGURE 6 is an end elevational view of the phonograph pickup.

A pair of flat slots 52 and 54 extend from the rectangular recess 38A through the mounting member 24 in alignment with the electrodes 48 and 50 of the generating element 44, and electrically conducting contact plates 56 and 58 are anchored within the slots 52 and 54 remote from the generating element 44. An electrically conducting strip 60 extends from each of the conducting plates 56 and 58 through the slots 52 and 54 and into the sleeve 40 to abut the electrodes 48 and 50 of the generating element 44. In this manner, electrical contact is made between each of the electrodes 48 and 50 of the generating element 44 and the exterior of the phonograph pickup. As illustrated in FIGURE 6, a second pair of identical slots extend from the element 42 through the mounting member 24 and terminate in contact plates 60 and 62 for making electrical contact to the electrodes 48 and 50 on the generating element 42.

A yoke 64 is mounted on the end of each of the elements 42 and 44 opposite the mounting member 24. As best illustrated in FIGURE 3, the yoke has two leg portions 66 and 68 and a centrally interconnecting portion 70. The leg portions 66 and 68 are each mounted on the elements 44 and 42, respectively, and have enlarged ends 71 which surround the ends of these elements. Between the ends 71 and the interconnecting portion 70, the leg portions 66 and 68 are generally normal to each other. The interconnecting portion 70 is provided with an indentation 72 or slot on the side thereof remote from the generating elements which engages one of two drive arms 74 and 76. Each of the drive arms is mounted at one end on the housing 32 by a mounting means, designated 78, and each carries a phonograph stylus 80 or 82 at its opposite end. The drive arms 74 and 76 are approximately parallel to axes of the generating elements 44 and 46.

The drive arms 74 and 76 extend through rectangular openings 84 and 86 on opposite sides of the casing 32, the openings 84 and 86 being generally parallel to the axis of the generating elements 44 and 46. The mounting means 78 for the drive arms 76 and 74 are fabricated of compliant material, such as rubber, and these mounting means engage the end of the openings 84 and 86 opposite the styli, here designated 88. The mounting means comprise a unitary structure with a flat flap portion 90 engaging the exterior of the casing 32 about the edges of the openings 84 and 86 and a second flap portion 92 disposed within the casing and engaging the interior portions about the openings 84 and 86. The casing 32 is recessed at its end opposite the mounting means 78, as indicated at 94 in FIGURE 1, and the width of the openings 84 and 86 is slightly greater adjacent to the recesses 94. The portion of the mounting means 78 between the two flap portions 90 and 92, designated 96, has approximately the thickness of the casing 32 and the width of the openings 84 and 86 adjacent to the ends 88 thereof so that the mounting means 78 may be inserted into the opening 84 or 86 at the recess 94 and slipped into engagement with the edge 88 of the opening in the casing 32. In this manner, the styli and their respective holders 74 and 76 may be removed and replaced when the styli 80 and 82 become worn.

It is to be noted that the contacts or contact plates 56, 58, 60 and 62 are stationary with respect to the tone arm 10 at all times during operation, and that the casing 32 is rotated relative to the mounting member to position one stylus drive arm 74 or the other stylus drive arm 76 in the indentation or slot 72 of the yoke 64 since the slot 72 extends through the yoke parallel to the drive arms. Rotation is achieved by means of an arm 98 which extends from the casing 32, as indicated in FIGURE 1. Stops are provided for the rotation by means of a pair of brackets 100 extending from opposite sides of the leg 18 of the mouuting bracket 14. Also, the cylindrical flange 26 of the mounting member 24 has a pair of protruding ribs 102 on opposite sides of the mounting member which mate with indentations 104 in the confronting casing 32 to provide an effective stop against further rotation of the casing 32 with respect to the mounting member 24 and the bracket 14.

Figure 5:
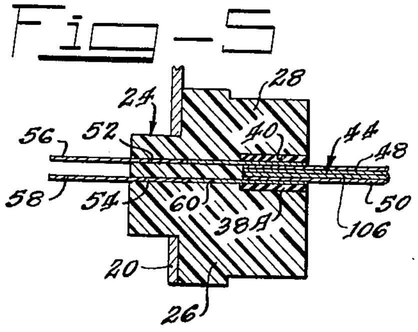
FIGURE 5 is a sectional view of the phonograph pickup taken along the line 5—5 of FIGURE 4.

Each of the ceramic piezoelectric elements 42 and 44 is provided with an electrically conducting central surface 106 which may be formed by a plurality of channels 108 filled with electrically conducting material, as illustrated in FIGURES 3, 4 and 5. Each of the elements 42 and 44 is polarized relative to this electrically conducting surface 106, and the polarization vectors between the surface 106 and the electrode 48 are directed oppositely from those between the surface 106 and the electrode 50. In this manner, bending of the ceramic elements 42 and 44 in a direction normal to the electrodes results in charges of opposite sign appearing on the electrodes 48 and 50. The yoke 64 is constructed of resilient or compliant material, such as rubber and soft polyvinyl chloride. It transmits forces exerted thereon by one of the styli and drive arms to the ceramic elements 42 and 44, and thereby the ceramic elements 42 and 44 generate charges on the surfaces thereof, and hence on the electrodes 48 and 50, for the components of force which are normal to these surfaces. In this manner, the pickup generates two electrical signals from a stereophonic record representing the two force components of the record.

Those skilled in the art will recognize that the foregoing phonograph pickup has many features which are applicable to monophonic phonograph pickups as well as stereophonic pickups. For example, a phonograph pickup according to the present invention could be utilized with a single generating element, such as 42, for monophonic reproduction, thus providing a two stylus phonograph pickup in which only one stylus is coupled to the generating element at any given time. It is thus clear that the present invention is not to be limited to the device herein disclosed, but rather only by the appended claim.

The invention claimed is:

A phonograph pickup comprising a generating element, means to mount the generating element on a tone arm including a member having a cylindrical surface and an end surface adjacent to the cylindrical surface, said member being disposed in a fixed position relative to the tone arm and the generating element being secured in a fixed position on the end surface of the cylindrical member, a casing having a recess extending therein from a circular mouth, said circular mouth being rotatably disposed about the cylindrical surface of the member and the generating element being disposed within the recess, said casing having at least two slots therein generally parallel to the rotational axis of the casing and communicating with the recess, a drive arm disposed in each slot and mounted at one end on the casing within the recess, each drive arm being approximately parallel to the axis of rotation of the casing and extending through the adjacent slot, and a yoke disposed within the recess and mechanically coupled to the generating element and extending therefrom normal to the rotational axis of the casing, said yoke having an indentation extending therein and confronting the casing, said indentation being approximately the same distance from the rotational axis of the casing as the drive arms, each of the drive arms engaging the indentation of the yoke in one rotational position of the casing, and a stylus mounted on the end of each of the drive arms remote from the casing, wherein a drive arm is mounted on the casing by removable means comprising a member of resilient material having a first portion with parallel edges spaced by approximately the width of the slot and nearly equal in thickness to the thickness of the casing, said portion being disposed in the slot at one end thereof, said member having second and third flap portions on opposite sides of the first portion, the second and third portions being of greater cross section than the first portion and abutting the exterior and interior surfaces of the casing respectively, the drive arm being secured to the surface of the third portion remote from the casing.

References Cited by the Examiner

UNITED STATES PATENTS

| | | | |
|---|---|---|---|
| 2,934,610 | 4/1960 | Dieter | 179—100.41 |
| 2,955,170 | 10/1960 | Dieter | 179—100.41 |
| 2,988,366 | 6/1961 | Hansen | 274—37 |
| 3,000,639 | 9/1961 | Jacque | 274—37 |

FOREIGN PATENTS

| | | |
|---|---|---|
| 808,121 | 1/1959 | Great Britain. |
| 228,122 | 5/1960 | Australia. |

IRVING L. SRAGOW, *Primary Examiner.*

NEWTON N. LOVEWELL, JOHN P. WILDMAN, *Examiners.*